March 6, 1951     F. KUPKA     2,543,856
LARGE APERTURE FOUR-MEMBER PHOTOGRAPHIC OBJECTIVE
Filed July 20, 1948

Inventor:
František Kupka,
by

Patented Mar. 6, 1951

2,543,856

UNITED STATES PATENT OFFICE 2,543,856

LARGE APERTURE FOUR-MEMBER PHOTOGRAPHIC OBJECTIVE

František Kupka, Prague, Czechoslovakia, assignor to Meopta, spojene zavody pro jemnou mechaniku a optiku, narodni podnik, Prerov, Czechoslovakia Application July 20, 1948, Serial No. 39,732
In Czechoslovakia August 4, 1947

1 Claim. (Cl. 88—57)

My invention relates to an objective for photographic and similar purposes, wherein in addition to astigmatism and coma particularly aperture and color defects are corrected and which comprises four air separated components of which the first is a simple convergent element, the second a compound convergent meniscus consisting of a convergent element cemented in front of a divergent element, the third a simple divergent element and the fourth a simple convergent element.

The object of my invention is to provide an improved photographic objective of the type described above and particularly applicable to cinematographic purposes. The new objective has a high luminosity and may be more easily manufactured than known objectives of the same type as it employs spherical surfaces of small curvature. In order to accomplish the objects of my invention I impart to my new improved objective the following characteristics: the cemented surface of the compound convergent meniscus forming the second component of the objective has a radius of curvature of an absolute value between six times the equivalent of focal length of the objective and infinity; the surface of the first component facing said second component has a radius of curvature of a value between two and a half times the equivalent of the focal length of the objective and infinity; the mean refractive index of the material used for the convergent element of said second component is greater than 1.65; and the Abbe number of the material used for the divergent element of said second component is at least thirty percent smaller than the Abbe number of the material used for the said convergent element of said second component.

The said and other objects of my invention and the application of its principles will be more fully understood from the following specification when read with the accompanying drawing in which one embodiment is illustrated.

Figure 1:
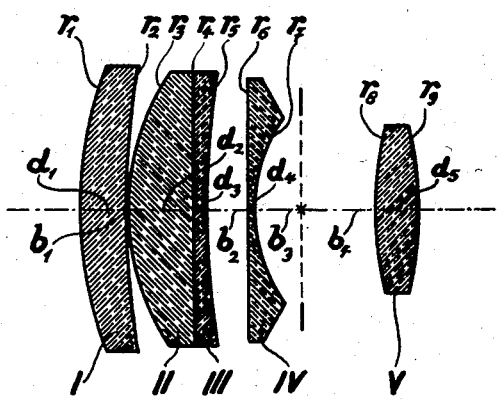
Figure 2:
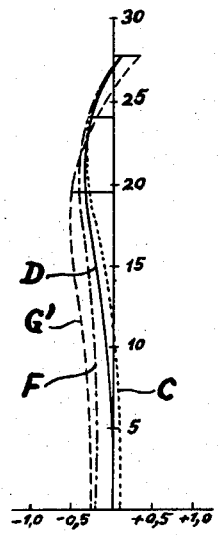

In the drawing Fig. 1 shows a sectional view through a lens system embodying my invention, and Fig. 2 shows a diagram of the spherical and chromatical correction curves of the aperture defect for the spectral lines C, D, F and G' at a focal length f=100 mm.

The objective illustrated in Fig. 1 is composed of four air separated components I, II, III and IV of which the first is a simple convergent element, the second a compound convergent meniscus consisting of a convergent element cemented in front of a divergent element, the third a simple divergent element and the fourth a simple convergent element. The radii of curvature of the individual surfaces are indicated $r_1$ through $r_9$, the axial thicknesses of the individual elements $d_1$ through $d_5$, and the axial air separations between said components $b_1$ through $b_4$.

The following tables give numerical values in millimeters for three embodiments of the invention, all having a focal length f=100 mm., and an aperture ratio of 1:1.8, 1:1.67 and 1:1.8, respectively. These tables contain also the refractive indices $n_{DI}$, through $n_{DV}$ for the D sodium line and the respective Abbe numbers $\nu_I$ through $\nu_V$ of the glass used in each of the five optical elements.

Example 1

[Focal length=100 mm. Aperture ratio, 1:1.8.]

| | | | |
|---|---|---|---|
| $r_1= +78.00$ | $d_1= 9.5$ | $n_{DI}=1.65981$ | $\nu_I=50.3$ |
| $r_2=+270.00$ | $b_1= 0.1$ | $n_{DII}=1.65981$ | $\nu_{II}=50.3$ |
| $r_3= +45.50$ | $d_2=13.00$ | $n_{DIII}=1.71715$ | $\nu_{III}=29.6$ |
| $r_4= 8$ | $d_3= 2.5$ | $n_{DIV}=1.71715$ | $\nu_{IV}=29.6$ |
| $r_5=+200.00$ | $b_2= 8.2$ | $n_{DV}=1.61216$ | $\nu_V=58.0$ |
| $r_6=-600.00$ | $d_4= 1.5$ | | |
| $r_7= +31.50$ | $b_3= 9.4$ | | |
| $r_8=+109.00$ | $b_4=15.6$ | | |
| $r_9= -72.82$ | $d_5= 7.0$ | | |

Example 2

[Focal length=100 mm. Aperture ratio 1:1.67.]

| | | | |
|---|---|---|---|
| $r_1= +80.0$ | $d_1= 9.75$ | $n_{DI}=1.65981$ | $\nu_I=50.3$ |
| $r_2=+256.6$ | $b_1= 0.10$ | $n_{DII}=1.65981$ | $\nu_{II}=50.3$ |
| $r_3= +46.6$ | $d_2=13.30$ | $n_{DIII}=1.71715$ | $\nu_{III}=29.6$ |
| $r_4=-616.0$ | $d_3= 2.60$ | $n_{DIV}=1.71715$ | $\nu_{IV}=29.6$ |
| $r_5=+215.6$ | $b_2= 8.40$ | $n_{DV}=1.61216$ | $\nu_V=58.0$ |
| $r_6=-667.3$ | $d_4= 1.50$ | | |
| $r_7= +31.6$ | $b_3= 9.45$ | | |
| $r_8= +97.5$ | $b_4=16.25$ | | |
| $r_9= -71.7$ | $d_5=11.80$ | | |

Example 3

[Focal length=100 mm. Aperture ratio 1:1.8.]

| | | | |
|---|---|---|---|
| $r_1= +82.0$ | $d_1=10.0$ | $n_{DI}=1.65981$ | $\nu_I=50.3$ |
| $r_2=+283.8$ | $b_1= 0.1$ | $n_{DII}=1.65981$ | $\nu_{II}=50.3$ |
| $r_3= +47.8$ | $d_2=12.6$ | $n_{DIII}=1.71715$ | $\nu_{III}=29.6$ |
| $r_4=+630.7$ | $d_3= 2.6$ | $n_{DIV}=1.71715$ | $\nu_{IV}=29.6$ |
| $r_5=+191.3$ | $b_2= 8.6$ | $n_{DV}=1.61216$ | $\nu_V=58.0$ |
| $r_6=-546.6$ | $d_4= 1.6$ | | |
| $r_7= +32.8$ | $b_3=10.9$ | | |
| $r_8= +97.8$ | $b_4=15.4$ | | |
| $r_9= -71.4$ | $d_5= 8.9$ | | |

The diagram shown in Fig. 2 is based upon the following values indicating the spherical and chromatical corrections for the embodiment according to Example 1:

| $h$ | C | D | F | G' |
|---|---|---|---|---|
| 0 | +0.120 | 0 | −0.225 | −0.281 |
| 19.45 | −0.289 | −0.327 | −0.423 | −0.523 |
| 24.06 | −0.240 | −0.241 | −0.306 | −0.150 |
| 27.78 | +0.168 | +0.148 | +0.160 | +0.373 |

In the foregoing table $h$ represents the height above the optical axis of the system at which a particular ray strikes the object side of the first lens. The values outlined in the table for the lines C, D, F and G', which are the Frauenhofer lines of the spectrum, are obtained by deducting the chordal distance for a height $h=0$ in line D from the chordal distance for the respective height $h$ and the respective line.

The following table shows the Seidel's coefficients for each surface $r_1$ through $r_9$ and for the sodium line D, namely the coefficients A of spherical aberrations, B of coma, $\Gamma$ of astigmatism, P of field curvature, and $\square$ of distortion. The total sums in each column indicate the resulting values of the whole optical system.

| r | A | B | Γ | P | □ |
|---|---|---|---|---|---|
| 1 | +0.5007 | +0.3905 | +0.3046 | +0.5096 | +0.6355 |
| 2 | +0.0198 | −0.0712 | +0.2553 | −0.1472 | −0.3877 |
| 3 | +0.2270 | +0.1761 | +0.1363 | +0.8736 | +0.7813 |
| 4 | −0.1498 | +0.0699 | −0.0326 | 0 | +0.0152 |
| 5 | +1.4219 | −1.1020 | +0.8540 | −0.2088 | −0.5000 |
| 6 | −2.4070 | +1.2131 | −0.6114 | −0.0696 | +0.3432 |
| 7 | −0.5289 | −0.7237 | −0.9902 | −1.3257 | −3.1688 |
| 8 | −0.0012 | −0.0107 | −0.0908 | +0.3483 | +2.1788 |
| 9 | +1.2173 | +0.2295 | +0.4320 | +0.5214 | +0.1064 |
|   | +0.3004 | +0.1715 | −0.1313 | +0.5016 | +0.0039 |

What I claim as my invention and desire to secure by Letters Patent is:

A photographic objective with large relative aperture, corrected for spherical and chromatic aberrations, coma and astigmatism, and comprising four air-separated components of which the first is a single convergent element, the second a compound convergent meniscus consisting of a convergent element cemented in front of a divergent element, the third a simple divergent element, and the fourth a simple convergent element, and wherein the cemented surface of said second component has a radius of curvature of absolute value between six times the equivalent of focal length of the objective and infinity; the surface of the first component facing the second component has a radius of curvature of a value between two and one half times the equivalent focal length of the objective and infinity; the mean refractive index of the material used for the convergent element of the second component is greater than 1.65; and the Abbe number of the material used for the divergent element of the second component is at least thirty percent smaller than the Abbe number of the material used for the convergent element of the same component.

FRANTIŠEK KUPKA.

REFERENCES CITED

The following references are of record in the file of this patent:

UNITED STATES PATENTS

| Number | Name | Date |
|---|---|---|
| 1,584,271 | Bertele | May 11, 1926 |
| 1,708,863 | Bertele | Apr. 9, 1929 |
| 2,170,428 | Richter | Aug. 22, 1939 |
| 2,297,452 | Berek et al. | Sept. 29, 1942 |
| 2,399,858 | Cox | May 7, 1946 |
| 2,449,769 | Cox | Sept. 21, 1948 |